(12) United States Patent
Fong et al.

(10) Patent No.: US 12,687,900 B2
(45) Date of Patent: Jul. 21, 2026

(54) ELECTRONIC DEVICE

(71) Applicant: ASUSTek COMPUTER INC., Taipei City (TW)

(72) Inventors: Mu-Chern Fong, Taipei City (TW); Yu-Jen Chen, Taipei City (TW); Yi-Wei Lee, Taipei City (TW); Chin-Chung Lai, Taipei City (TW); Tsung-Ju Chiang, Taipei City (TW)

(73) Assignee: ASUSTek COMPUTER INC., Taipei City (TW)

( * ) Notice: Subject to any disclaimer, the term of this patent is extended or adjusted under 35 U.S.C. 154(b) by 89 days.

(21) Appl. No.: 18/977,852

(22) Filed: Dec. 11, 2024

(65) Prior Publication Data

US 2026/0126833 A1 May 7, 2026

(30) Foreign Application Priority Data

Nov. 4, 2024 (TW) ................................. 113142030

(51) Int. Cl.
*G06F 1/16* (2006.01)
(52) U.S. Cl.
CPC .................................. *G06F 1/1681* (2013.01)
(58) Field of Classification Search
CPC .... G06F 1/1681; G06F 1/1618; G06F 1/1616; F16C 11/04; E05D 3/06; E05D 3/12; E05D 3/14
See application file for complete search history.

(56) References Cited

U.S. PATENT DOCUMENTS

| | | | | |
|---|---|---|---|---|
| 10,114,424 B2 * | 10/2018 | Campbell | ........... | E05D 11/0054 |
| 11,287,854 B2 | 3/2022 | Morino et al. | | |
| 12,504,792 B2 * | 12/2025 | Feng | ..................... | G06F 1/1681 |
| 12,577,979 B2 * | 3/2026 | Caplow-Munro | ...... | F16C 11/04 |
| 2016/0224072 A1 * | 8/2016 | Huang | .................. | G06F 1/1681 |
| 2016/0349802 A1 * | 12/2016 | Ahn | ......................... | G06F 1/1681 |
| 2017/0336835 A1 * | 11/2017 | Lin | ......................... | G06F 1/1615 |
| 2020/0326757 A1 * | 10/2020 | Huang | .................. | H04M 1/022 |
| 2021/0356998 A1 * | 11/2021 | Park | ....................... | G06F 1/1681 |
| 2025/0207628 A1 * | 6/2025 | Lin | ......................... | F16C 11/103 |

FOREIGN PATENT DOCUMENTS

| | | |
|---|---|---|
| CN | 107422789 | 12/2017 |
| CN | 112286282 A | 1/2021 |
| CN | 107390787 | 11/2023 |
| CN | 221195715 U | 6/2024 |
| TW | M627961 U | 6/2022 |

* cited by examiner

*Primary Examiner* — Sagar Shrestha
(74) *Attorney, Agent, or Firm* — JCIPRNET

(57) ABSTRACT

An electronic device including a first body, a second body, a pivot module and a connection casing is provided. The second body is pivotably connected to the first body. The pivot module includes a first torsion portion and a second torsion portion. A rotational torsion of the first torsion portion is smaller than a rotational torsion of the second torsion portion. Part of the pivot module is movably located in the connection casing. The connection casing includes a first connection casing, a second connection casing and a third connection casing. The first connection casing is movably connected to the first body and is movably connected to the second connection casing. The third connection casing is movably connected to the second body and is movably connected to the second connection casing.

11 Claims, 9 Drawing Sheets

ELECTRONIC DEVICE

CROSS-REFERENCE TO RELATED APPLICATION

This application claims the priority benefit of Taiwan application serial no. 113142030, filed on Nov. 4, 2024. The entirety of the above-mentioned patent application is hereby incorporated by reference herein and made a part of this specification.

BACKGROUND

Technical Field

The disclosure relates to an electronic device.

Description of Related Art

The modern electronic device (for example, the laptop computer) includes two bodies and a pivot. The pivot, for example, may be a bellows-type pivot composed of a plurality of components. Since the structure of the bellows-type pivot is complex, the cost of the electronic device is increased, and the components of the pivot are prone to damage, that is unfavorable for the assembly and use of the electronic device.

SUMMARY

The disclosure provides an electronic device that is convenient to use.

A electronic device of the disclosure includes a first body, a second body, a pivot module, and a connection casing. The second body may be pivotally connected to the first body. The pivot module includes a first connector, a second connector and a third connector connected in sequence. The first connector is connected to the first body, and the third connector is connected to the second body. The first connector and the second connector jointly form a first torsion portion, and the third connector and the second connector jointly form a second torsion portion. A rotational torque of the first torsion portion is smaller than a rotational torque of the second torsion portion. A part of the pivot module is movably located within the connection casing. The connection casing includes a first connection casing, a second connection casing, and a third connection casing. The first connection casing is movably connected to the first body and movably connected to the second connection casing. The third connection casing is movably connected to the second body and movably connected to the second connection casing.

Based on the above, the rotational torque generated by the first torsion portion of the pivot module of the electronic device of the disclosure is different from the rotational torque generated by the second torsion portion, so that the actuation sequence of the first connector, second connector, and third connector of the pivot module may be controlled. The structure of the pivot module is simple, so as to reduce the cost of the electronic device and make the electronic device easy to assemble, making the electronic device convenient to use. The connection casing accommodates the pivot module, and the first connection casing and the third connection casing may move relative to the second connection casing to maintain the aesthetic appearance of the electronic device.

DESCRIPTION OF THE EMBODIMENTS

Figure 1:
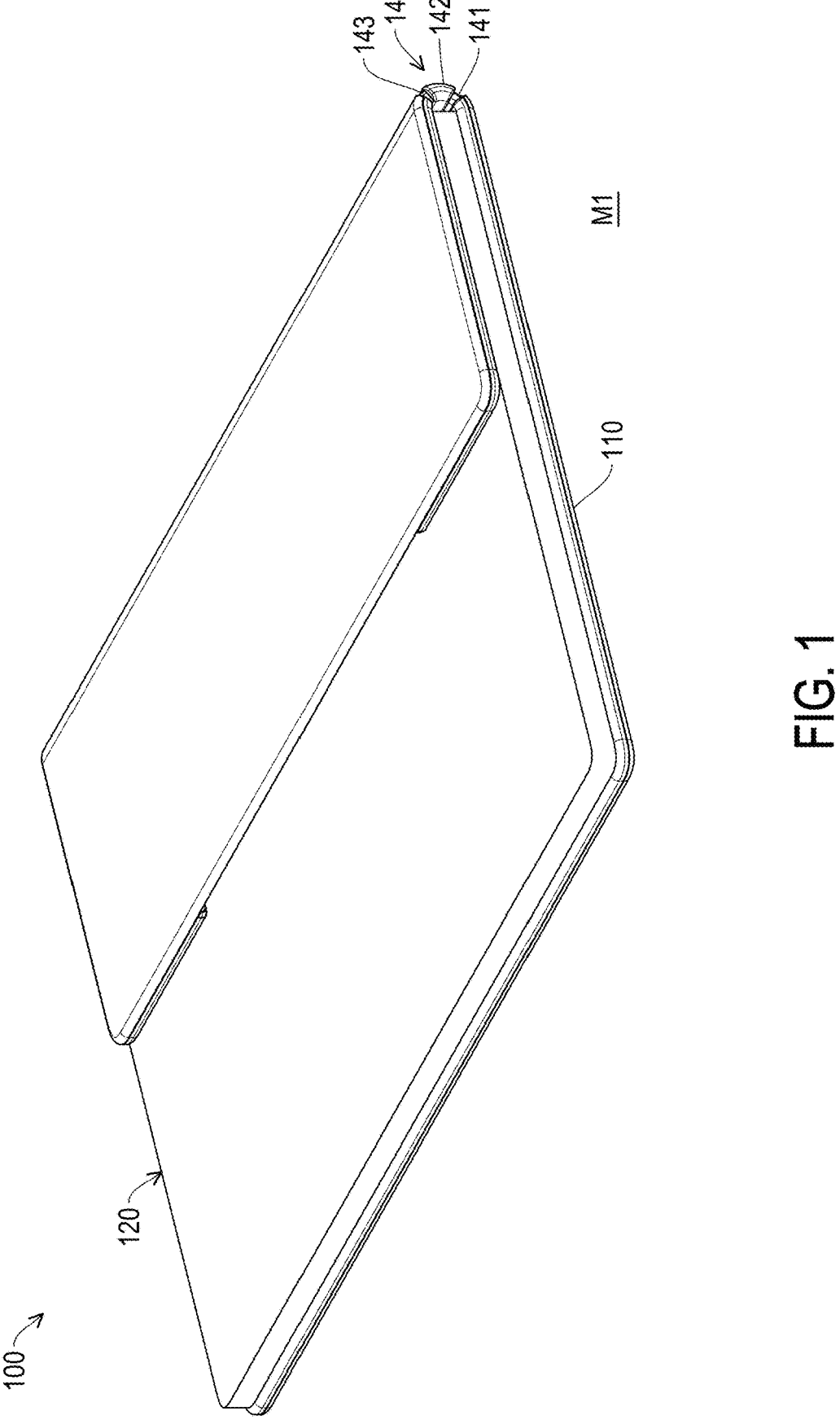
FIG. 1 is a schematic diagram of an electronic device according to an embodiment of the disclosure.
Figure 2:
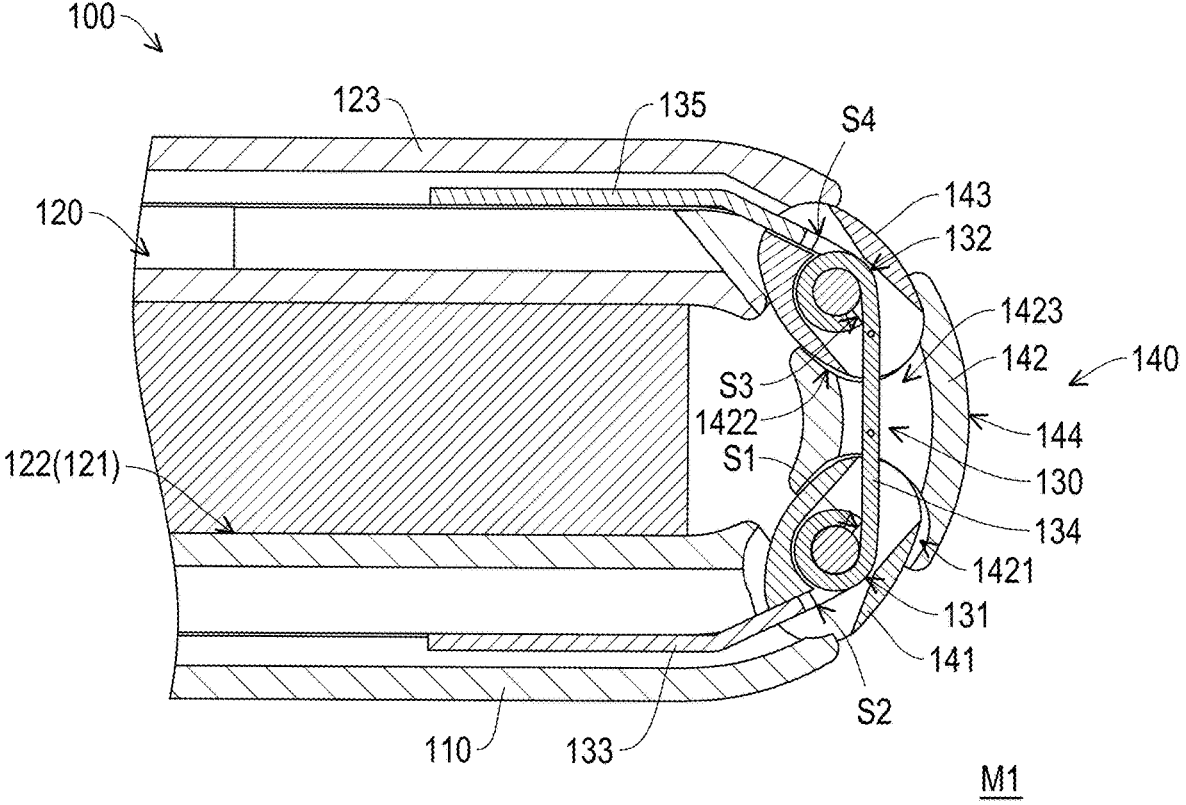
FIG. 2 is a cross-sectional view of the electronic device in FIG. 1.
Figure 3:
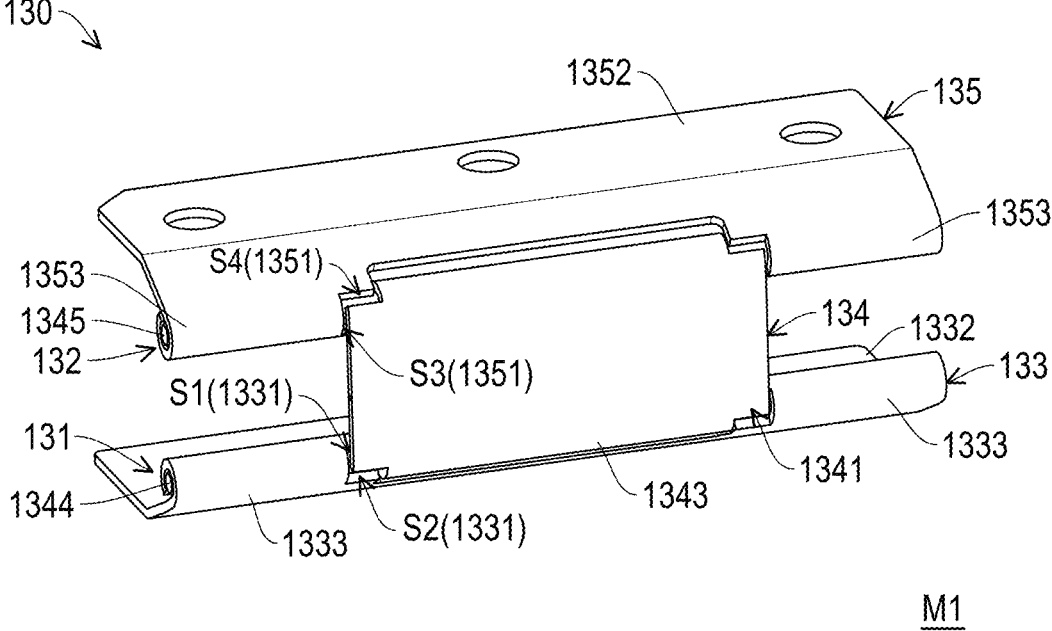
FIG. 3 is a schematic diagram of the pivot module in FIG. 2.
Figure 4:
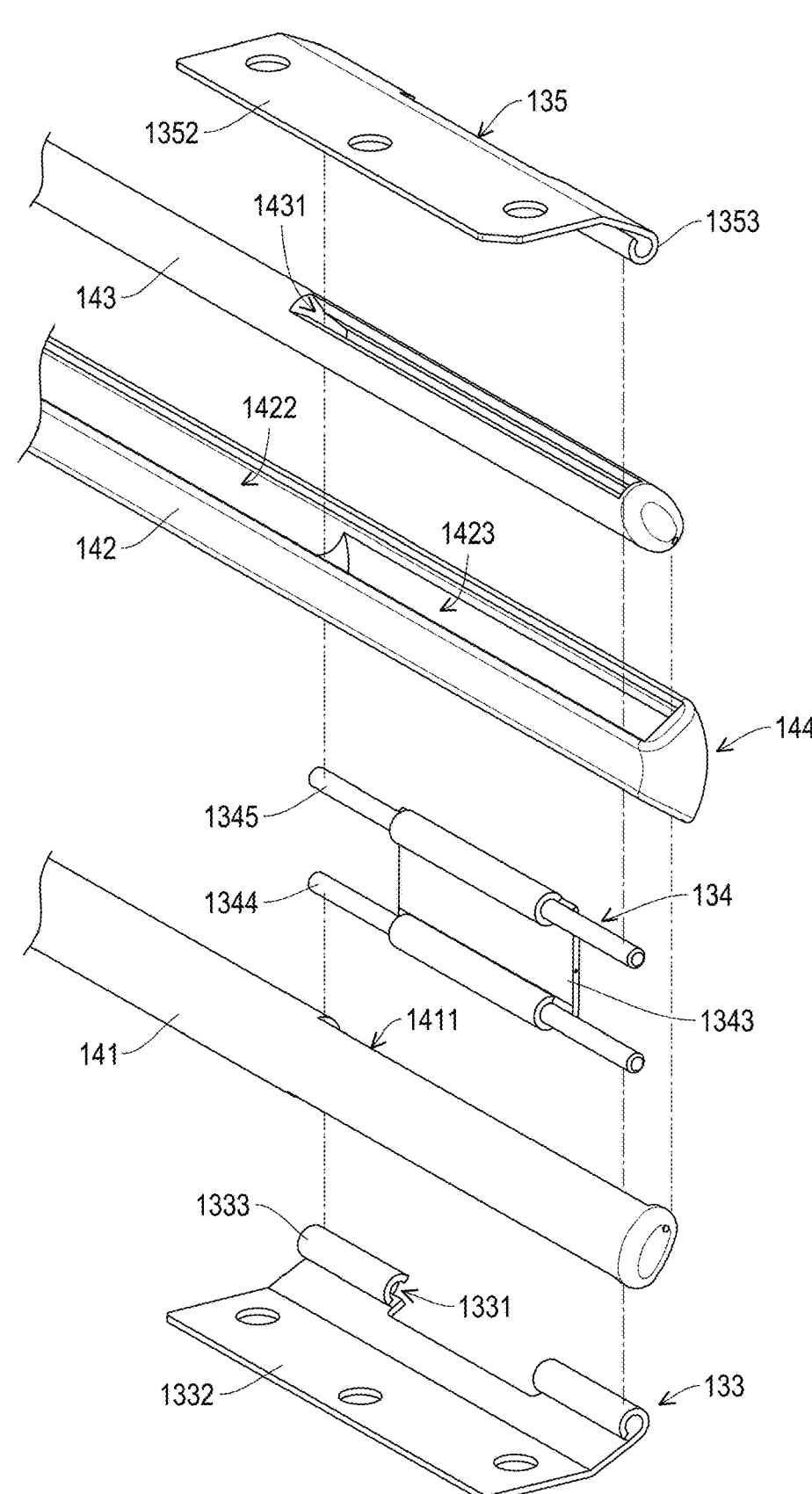
FIG. 4 is an exploded view of the pivot module in FIG. 2.

FIG. 1 is a schematic diagram of an electronic device according to an embodiment of the disclosure. FIG. 2 is a cross-sectional view of the electronic device in FIG. 1. FIG. 3 is a schematic diagram of the pivot module in FIG. 2. FIG. 4 is an exploded view of the pivot module in FIG. 2. Please refer to FIG. 1 to FIG. 4 at the same time, the electronic device 100 includes a first body 110, a second body 120, a pivot module 130, and a connection casing 140. The second body 120 is pivotally connected to the first body 110 through the pivot module 130. The pivot module 130 includes a first connector 133, a second connector 134, and a third connector 135 connected in sequence. The first connector 133 is connected to the first body 110, and the third connector 135 is connected to the second body 120. The first connector 133 and the second connector 134 jointly form a first torsion portion 131, and the third connector 135 and the second connector 134 jointly form a second torsion portion 132. A rotational torque of the first torsion portion 131 is smaller than a rotational torque of the second torsion portion 132.

Part of the pivot module 130 is movably located within the connection casing 140. The connection casing 140 includes a first connection casing 141, a second connection casing 142, and a third connection casing 143. The first connection casing 141 is movably connected to the first body 110, and is movably connected to the second connection casing 142. The third connection casing 143 is movably connected to the second body 120, and is movably connected to the second connection casing 142.

The rotation of the second body 120 relative to the first body 110 drives the pivot module 130 and the connection casing 140 to actuate. Since the rotational torque the first torsion portion 131 and the rotational torque of the second torsion portion 132 are the different, the first torsion portion 131 with the smaller rotational torque is driven first by the second body 120, causing the second connector 134 to rotate first. Then, the second body 120 drives the second torsion portion 132 with the larger rotational torque, causing the third connector 135 to rotate. By driving the first torsion portion 131 and the second torsion portion 132 in stages, the electronic device 100 may stably switch between a first state M1 (in FIG. 1) and a second state M2 (in FIG. 6) even when the pivot module 130 only has two rotation centers (i.e., the first torsion portion 131 and the second torsion portion 132). The structure of the pivot module 130 is simple, so as to reduce the cost of the electronic device 100, extend the lifespan of components, and make the electronic device 100 easy to assemble, making the electronic device 100 convenient in use.

When the second body 120 drives the pivot module 130 to actuate, the pivot module 130 and the connection casing 140 move relative to each other. The first connection casing 141, the second connection casing 142, and the third connection casing 143 move relative to each other. The electronic device 100, through the connection casing 140, provides a bellows-type appearance for the connecting portion of the first body 110 and the second body 120, while simplifying the quantity and the structure of components in the pivot module 130, maintaining the aesthetic appearance of the electronic device 100.

In an embodiment, the number of the pivot modules 130 may be one, two, or any arbitrary number. The electronic device 100 in this embodiment may be a laptop computer, but not limited thereto. As shown in FIG. 1, the second body 120 includes a body casing 123 and a display module 121. The body casing 123 is connected to the third connection casing 143 of the connection casing 140, and the display module 121 is disposed at the body casing 123. The first body 110 may include a keyboard (not shown), but not limited thereto. In an unillustrated embodiment, the electronic device 100 may be an external electronic device for connecting to a display device (not shown). The second body 120 only includes the body casing 123, and the body casing 123 may serve as a support frame. The display device may be detachably connected to the body casing 123 of the second body 120. The display device may be a tablet, for example, but not limited thereto.

As shown in FIG. 2 to FIG. 4, the first connection casing 141 includes a slot 1411. The second connection casing 142 includes two grooves 1421, 1422 and a slot 1423. The slot 1423 connecting to the two grooves 1421, 1422. The third connection casing 143 includes a slot 1431. The two ends of the first connection casing 141 are inserted into the first body 110 and the groove 1421 of the second connection casing 142 respectively. The two ends of the third connection casing 143 are inserted into the second body 120 and the groove 1422 of the second connection casing 142 respectively. A curvature of an outer surface 144 of the second connection casing 142 is greater than zero. The curvatures of the outer surfaces of the first connection casing 141 and the third connection casing 143 are greater than zero, but not limited thereto. The first torsion portion 131 of the pivot module 130 is located within the slot 1411 of the first connection casing 141, and the second torsion portion 132 is located within the slot 1431 of the third connection casing 143.

The second connector 134 of the pivot module 130 connects between the first connector 133 and the third connector 135. The first connector 133 is connected to the first body 110, and a part of the first connector 133 is located within the slot 1411 of the first connection casing 141. The second connector 134 is located within the slots 1411, 1423, 1431 of the connection casing 140. The third connector 135 is connected to the second body 120, and a part of the third connector 135 is located within the slot 1431 of the third connection casing 143.

In this embodiment, the first torsion portion 131 and the second torsion portion 132 are wrap-around torsion structures, but not limited thereto. The first connector 133 includes a connected first connection body 1332 and a first sleeve 1333, and the first connection body 1332 connected to the first body 110. The second connector 134 includes a second connection body 1343, a first shaft 1344, and a second shaft 1345. The first shaft 1344 and the second shaft 1345 connected to two ends of the second connection body 1343. The third connector 135 includes a connected third connection body 1352 and a second sleeve 1353, and the third connection body 1352 connected to the second body 120.

The first shaft 1344 is sleeved within the first sleeve 1333 to form the first torsion portion 131. The second shaft 1345 is sleeved within the second sleeve 1353 to form the second torsion portion 132. A distance between the first torsion portion 131 and the first body 110 is smaller than a distance between the second torsion portion 132 and the first body 110. In other words, the first torsion portion 131 is closer to the first body 110. A ratio of the rotational torque of the first torsion portion 131 to the rotational torque of the second torsion portion 132 may be between 0.3 and 0.5, but not limited thereto. The first shaft 1344 is located outside the first body 110, and the second shaft 1345 is located outside the second body 120.

When the second connector 134 rotates relative to the first connector 133, the second connector 134 may rotate relative to the first sleeve 1333 with the first shaft 1344 as the center of rotation. When the second connector 134 and the third connector 135 rotate relative to each other, the third connector 135 may rotate with the second shaft 1345 as the center of rotation.

As shown in FIG. 3, the second connector 134 includes a first protrusion 1341 and a second protrusion 1342. The first protrusion 1341 and the second protrusion 1342 are connected to the second connection body 1343. The first connector 133 includes a first stop slot 1331, and the third connector 135 includes a second stop slot 1351. The first stop slot 1331 is formed on the first sleeve 1333, and the first protrusion 1341 located within the first stop slot 1331. The second stop slot 1351 is formed on the second sleeve 1353, and the second protrusion 1342 located within the second stop slot 1351.

The first protrusion 1341 may contact one of two walls S1, S2 of the first stop slot 1331, thereby limiting the rotation direction and the rotation angle of the second connector 134 relative to the first connector 133. The second protrusion 1342 may contact one of two walls S3, S4 of the second stop slot 1351, thereby limiting the relative rotation direction and the relative rotation angle between the second connector 134 and the third connector 135.

FIG. 1 to FIG. 3 show the electronic device 100 in a first state M1. In the first state M1, a display surface 122 of the display module 121 of the second body 120 faces towards the first body 110, and the second body 120 is parallel to the first body 110. The electronic device 100 is closed. The first protrusion 1341 of the second connector 134 contacts the wall S1 of the first stop slot 1331, and the second protrusion 1342 contacts the wall S3 of the second stop slot 1351.

Figure 5A:
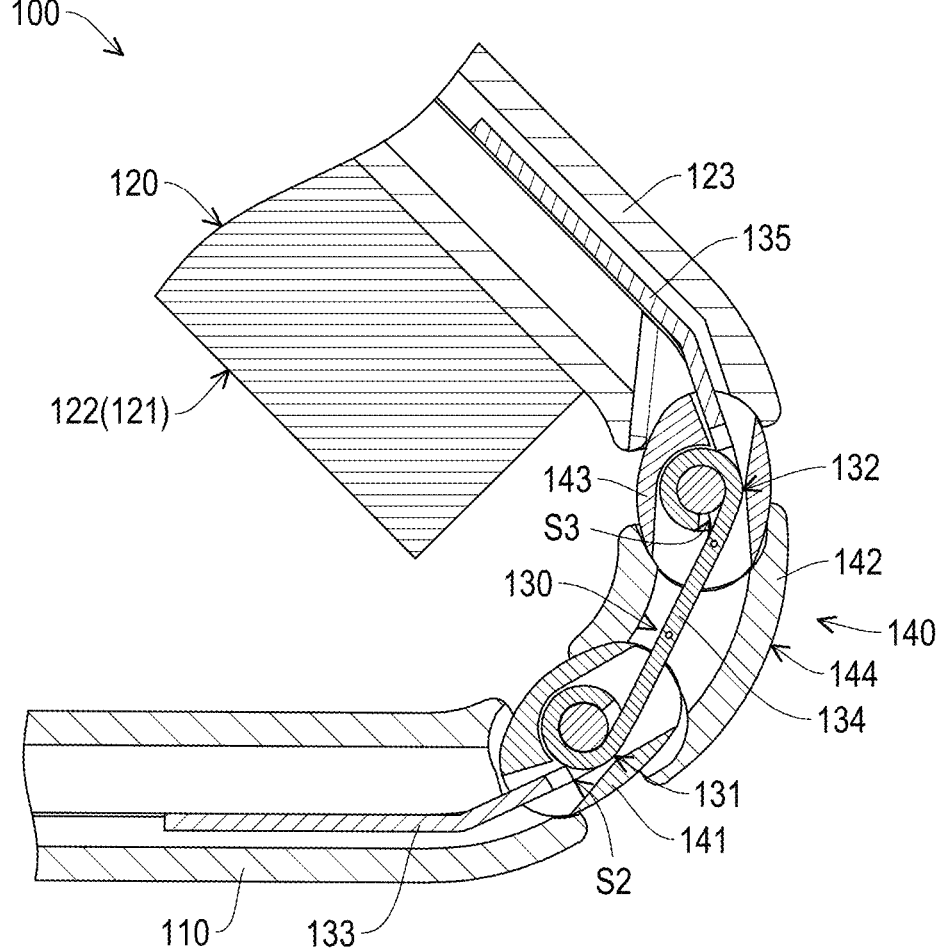
FIG. 5A is a cross-sectional view of the electronic device after the second body in FIG. 2 has rotated.
Figure 5B:
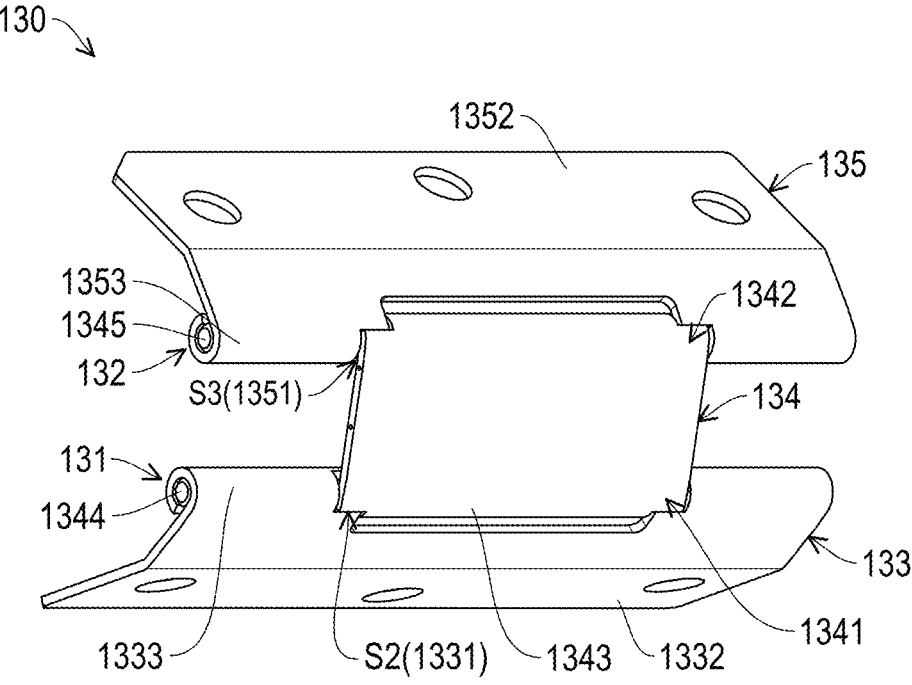
FIG. 5B is a schematic diagram of the pivot module in FIG. 5A.

FIG. 5A is a cross-sectional view of the electronic device after the second body in FIG. 2 has rotated. FIG. 5B is a schematic diagram of the pivot module in FIG. 5A Please refer to FIG. 5A and FIG. 5B at the same time. When switching the electronic device 100 from the first state M1 to the second state M2, the second body 120 may be forced to rotate relative to the first body 110. The rotation of the second body 120 drives the pivot module 130 and the connection casing 140 to move relative to the first body 110. Since the rotational torque of the first torsion portion 131 is smaller than the rotational torque of the second torsion portion 132, the first torsion portion 131 actuates first when force is applied to the second body 120. In other words, the second connector 134 rotates relative to the first connector 133 first.

The first protrusion 1341 of the second connector 134 moves within the first stop slot 1331 of the first connector 133 until the first protrusion 1341 contacts the other wall S2 of the first stop slot 1331, thereby limiting the rotation angle of the second connector 134 relative to the first connector 133. At this point, the second body 120 drives the connection casing 140 to move to the position shown in FIG. 5A, and the second connector 134 moves to the position shown in FIG. 5A within the connection casing 140. The second protrusion 1342 still contacts the wall S3 of the second stop slot 1351.

Figure 6:
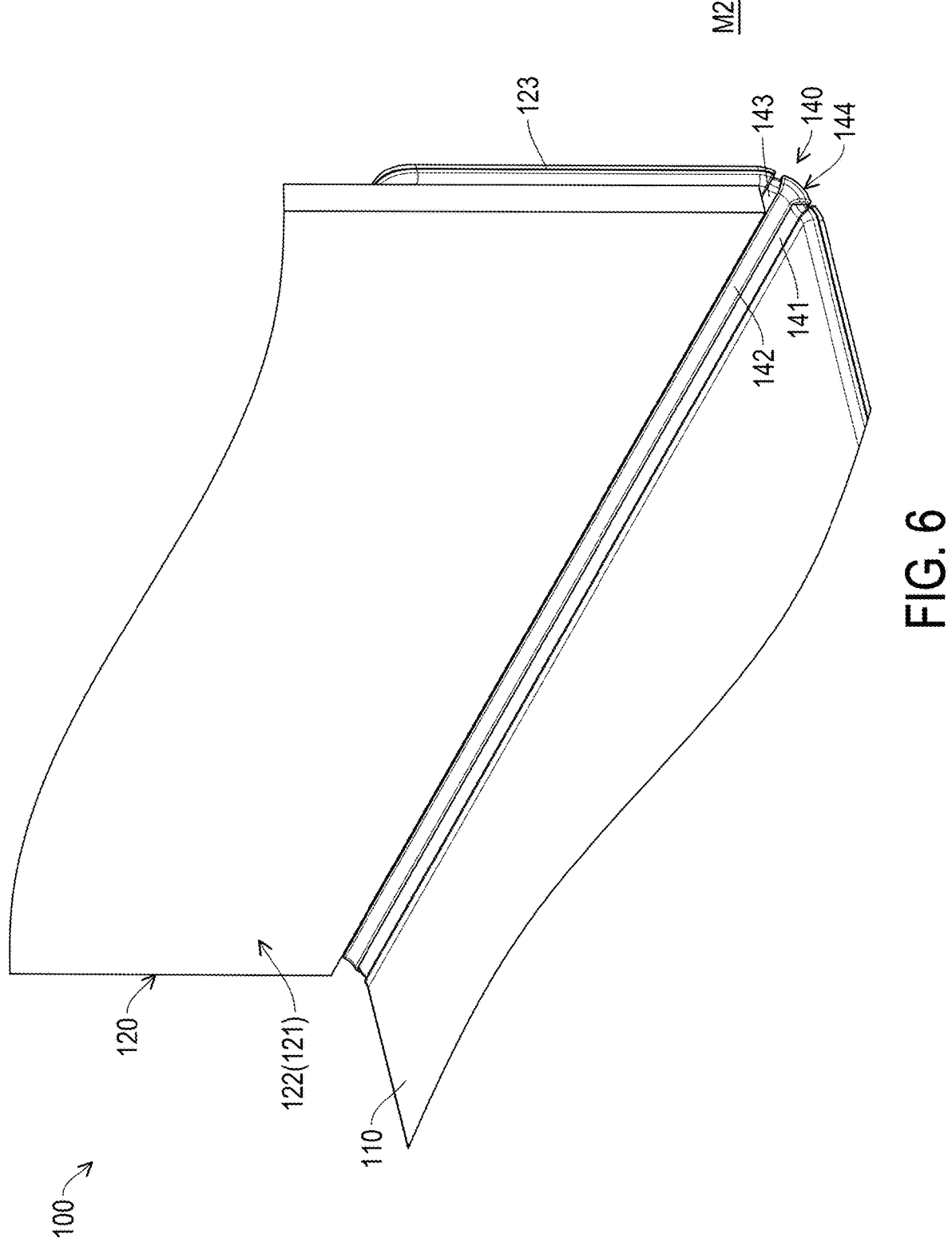
FIG. 6 is a schematic diagram of the electronic device in FIG. 1 in the second state.
Figure 7:
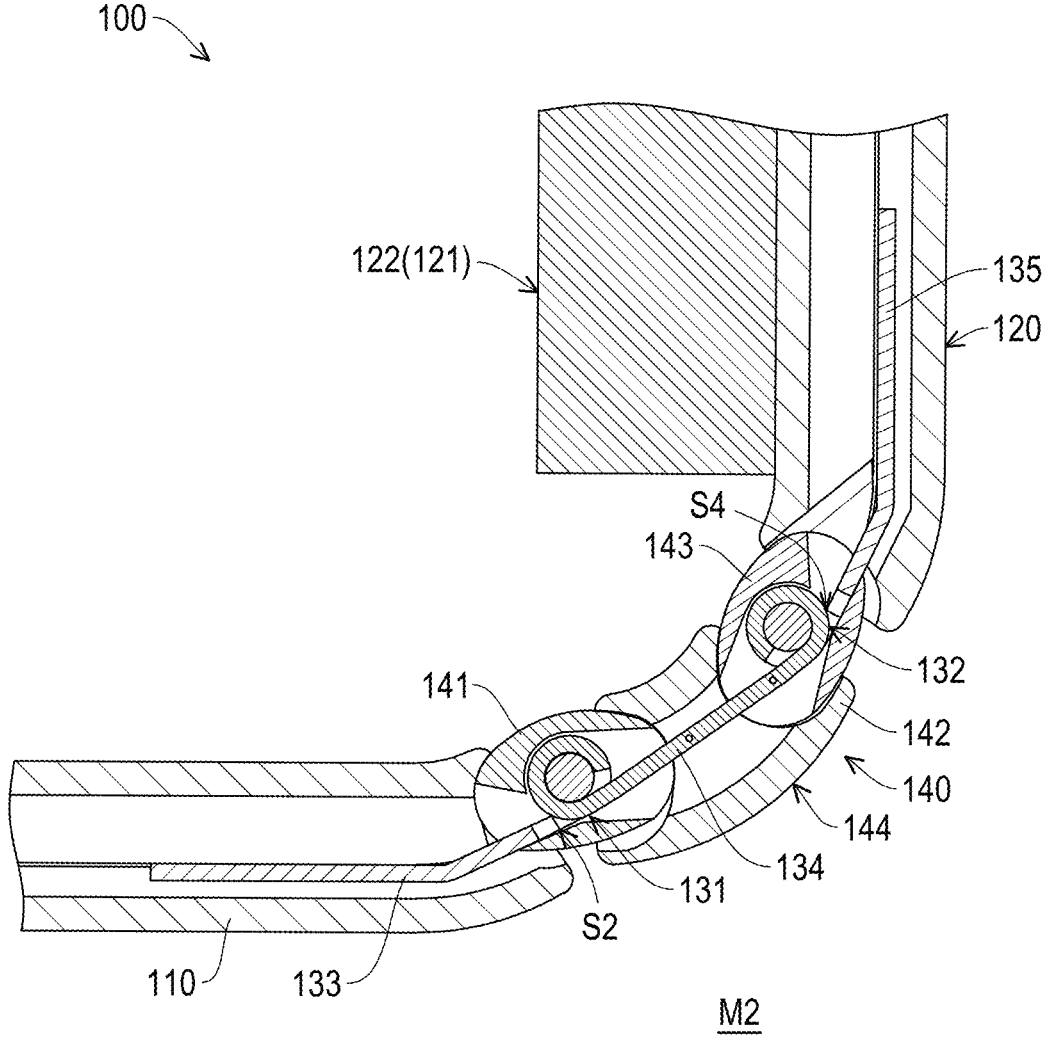
FIG. 7 is a cross-sectional view of the electronic device in FIG. 6.
Figure 8:
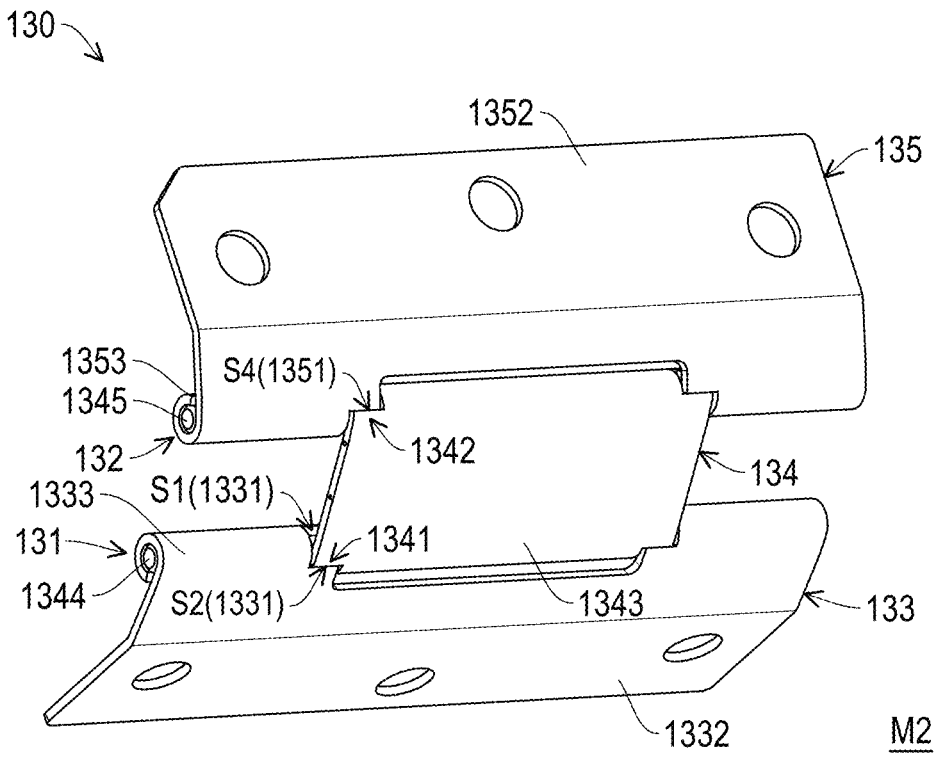
FIG. 8 is a schematic diagram of the pivot module in FIG. 7.

FIG. 6 is a schematic diagram of the electronic device in FIG. 1 in the second state. FIG. 7 is a cross-sectional view of the electronic device in FIG. 6. FIG. 8 is a schematic diagram of the pivot module in FIG. 7. Please refer to FIG. 6 to FIG. 8 at the same time. The second body 120 in FIG. 5A may continue to be forced until the electronic device 100 switches to the second state M2. During the process of the second body 120 rotating from the position in FIG. 5A to the position in FIG. 7, since the second connector 134 (the first protrusion 1341) is stopped by the first connector 133 (the first stop slot 1331), the third connector 135 is driven by the second body 120 to rotate relative to the second connector 134.

The second stop slot 1351 of the third connector 135 rotates relative to the second protrusion 1342 of the second connector 134 until the other wall S4 of the second stop slot 1351 contacts the second protrusion 1342, thereby limiting the rotation angle of the third connector 135 relative to the second connector 134, and limiting the opening angle of the second body 120 relative to the first body 110. At this point, the electronic device 100 switches to the second state M2. In the second state M2, the display surface 122 of the second body 120 faces outward for display. The electronic device 100 is opened. The opening angle between the second body 120 and the first body 110 may be 90 degrees, for example, but not limited thereto. The first protrusion 1341 contacts the wall S2 of the first stop slot 1331, and the second protrusion 1342 contacts the wall S4 of the second stop slot 1351.

When the electronic device 100 is to be switched from the second state M2 to the first state M1, the second body 120 may be forced to drive the pivot module 130. Since the rotational torque of the first torsion portion 131 is smaller than the rotational torque of the second torsion portion 132, the first torsion portion 131 actuates first until the first protrusion 1341 of the second connector 134 abuts against the wall S1 of the first stop slot 1331 of the first connector 133. The second body 120 continues to be forced, causing the second torsion portion 132 to actuate next, until the wall S3 of the second stop slot 1351 of the third connector 135 abuts against the second protrusion 1342 of the second connector 134. At this point, the electronic device 100 switches to the first state M1.

Thereby, through the first torsion portion 131 and the second torsion portion 132 with the different rotational torques, the first torsion portion 131 and the second torsion portion 132 may actuate in sequence, allowing the second body 120 of the electronic device 100 to pivot stably relative to the first body 110. Through the structure of the first connector 133, the second connector 134, and the third connector 135, the opening angle of the second body 120 is limited. Through the first connection casing 141, the second connection casing 142, and the third connection casing 143, that are relatively movable to each other, the electronic device 100 may maintain an aesthetically pleasing appearance when switching between the first state M1 and the second state M2.

In summary, the rotational torque generated by the first torsion portion of the pivot module of the electronic device of the disclosure is different from the rotational torque generated by the second torsion portion, so that the actuation sequence of the first connector, second connector, and third connector of the pivot module may be controlled. The structure of the pivot module is simple, so as to reduce the cost of the electronic device and make the electronic device easy to assemble, making the electronic device convenient to use. The connection casing accommodates the pivot module, and the first connection casing and the third connection casing may move relative to the second connection casing to maintain the aesthetic appearance of the electronic device.

What is claimed is:

1. An electronic device, comprising:
   a first body;
   a second body, pivotally connected to the first body;
   a pivot module, comprising a first connector, a second connector and a third connector connected in sequence, the first connector is connected to the first body, the third connector is connected to the second body, the first connector and the second connector jointly form a first torsion portion, the third connector and the second connector jointly form a second torsion portion, wherein a rotational torque of the first torsion portion is smaller than a rotational torque of the second torsion portion; and
   a connection casing, a part of the pivot module is movably located within the connection casing, the connection casing comprises a first connection casing, a second connection casing and a third connection casing, the first connection casing is movably connected to the first body and movably connected to the second connection casing, the third connection casing is movably connected to the second body and movably connected to the second connection casing.

2. The electronic device according to claim 1, wherein the first connector comprises a first sleeve, the second connector comprises a first shaft and a second shaft, the third connector comprises a second sleeve, the first shaft is sleeved within the first sleeve to form the first torsion portion, the second shaft is sleeved within the second sleeve to form the second torsion portion.

3. The electronic device according to claim 2, wherein the first shaft is located outside the first body, and the second shaft is located outside the second body.

4. The electronic device according to claim 1, wherein the second connector comprises a first protrusion and a second protrusion, the first connector comprises a first stop slot, the third connector comprises a second stop slot, the first protrusion is located within the first stop slot, and the second protrusion is located within the second stop slot.

5. The electronic device according to claim 4, wherein when the electronic device is in a first state, the first protrusion contacts a wall of the first stop slot, and the second protrusion contacts a wall of the second stop slot, when the electronic device is in a second state, the first protrusion contacts another wall of the first stop slot, and the second protrusion contacts another wall of the second stop slot.

6. The electronic device according to claim 1, wherein the first connector is connected to the first body and partially located within the first connection casing, the second connector is located within the connection casing, and the third connector is connected to the second body and partially located within the third connection casing.

7. The electronic device according to claim 1, wherein a ratio of the rotational torque of the first torsion portion to the rotational torque of the second torsion portion is between 0.3 and 0.5.

8. The electronic device according to claim 1, wherein the second body comprises a body casing and a display module, the body casing is connected to the third connection casing, and the display module is disposed at the body casing.

9. The electronic device according to claim 1, wherein a display device is detachably connected to the second body.

10. The electronic device according to claim 1, wherein a curvature of an outer surface of the second connection casing is greater than zero.

11. The electronic device according to claim 1, wherein the second connection casing comprises two grooves, part of the first connection casing extends into one of the two grooves, and part of the third connection casing extends into the other of the two grooves.

\* \* \* \* \*